E. M. SMITH.
RAIL JOINT.
APPLICATION FILED MAR. 29, 1913.
1,090,504.
Patented Mar. 17, 1914.
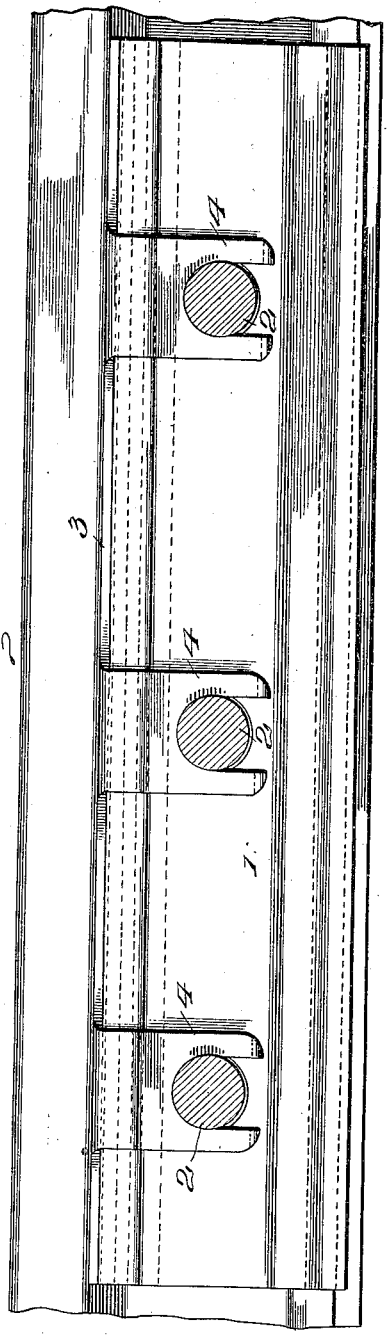
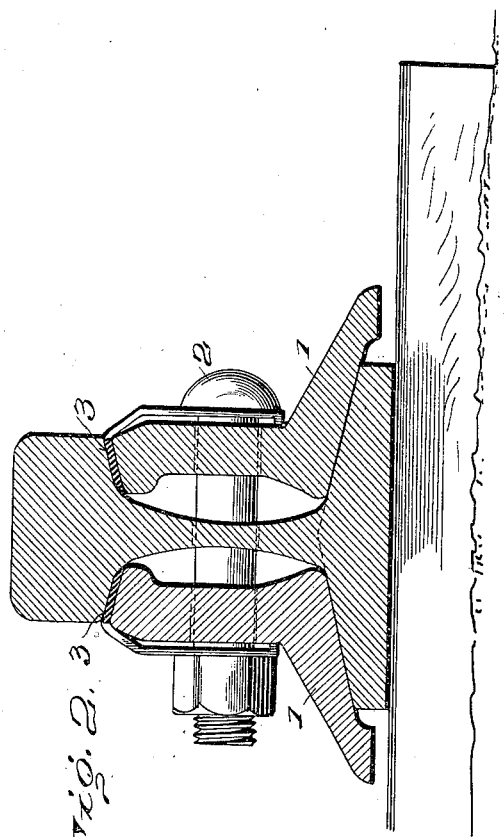
Witnesses
W. A. Williams.
Francis P. Maguire.
Inventor
Edgar M. Smith.
By
Attorney
COLUMBIA PLANOGRAPH CO., WASHINGTON, D. C.

UNITED STATES PATENT OFFICE.

EDGAR M. SMITH, OF CHICAGO, ILLINOIS.

RAIL-JOINT.

1,090,504.  Specification of Letters Patent.  Patented Mar. 17, 1914.

Application filed March 29, 1913. Serial No. 757,530.

*To all whom it may concern:*

Be it known that I, EDGAR M. SMITH, of Chicago, in the county of Cook and State of Illinois, have invented certain new and useful Improvements in Rail-Joints; and I do hereby declare the following to be a full, clear, and exact description of the invention, such as will enable others skilled in the art to which it appertains to make and use the same.

In rail joints, and especially in that class forming a stepped connection between adjoining rails of different cross sectional area, a type of which is shown in my Patent No. 922,533, dated May 25, 1909, the life of the joint-plates is usually shortened by wear due to expansion and contraction, resulting in cutting the joint-plates, thereby seriously impairing their efficiency, with the result that the cost of maintenance is materially increased.

The primary object of my invention is to provide simple and highly efficient means for preventing the wear of the joint-plates consequent upon expansion and contraction, thereby lengthening the life of the joints; and a further object is to utilize the same means for locking the nuts.

In the accompanying drawings, Figure 1 is a side elevation. Fig. 2 is a transverse sectional view.

The joint between rails is formed by plates 1, which are held to the meeting ends of adjacent rails by nutted bolts 2. Between the joint-plates and the under sides of the head or tread of the rail I locate bearings 3 of relatively hard metal, which bearings extend the full length of the plates along the upper faces thereof. These bearings are preferably composed of manganese steel. From the outer edges of the bearings I extend downwardly projecting prongs 4, of any desired number, having openings about equal to the cross sectional area of the bolts so that both plates may be retained in position by the heads and nuts, respectively, of the several bolts. These retaining prongs are extended down over the outer faces of the joint-plates so as not to interfere with the adjustment of the latter, it being possible, according to my invention, to periodically tighten the nutted bolts without in any way interfering with the hard metal plates. The latter may be applied to standard as well as stepped rail joints already in use. These plates protect the joints from wear due to contraction and expansion, which heretofore has caused cutting and consequent weakening of the joint-plates, necessitating frequent replacements, with a corresponding increase in the cost of maintenance.

The depending prongs at their lower ends have inwardly extending ribs or shoulders 6 which by bearing against the joint-plates give to the prongs a resiliency which is utilized in practice to lock the nuts and prevent the bolts being accidentally loosened.

I claim as my invention:

A joint for railway rails comprising a pair of joint-plates designed to be located at opposite sides of the adjoining ends of rails, nutted bolts for securing the joint-plates to the rails, and plates of hard metal extending along the upper longitudinal faces of the joint-plates, and having depending prongs of resilient material with which the nutted bolts are designed to engage, said prongs having inwardly projecting shoulders which are designed to bear against the faces of the plates.

In testimony whereof, I have signed this specification in the presence of two subscribing witnesses.

EDGAR M. SMITH.

Witnesses:
CLAYTON D. WALWORTH,
W. A. DUCKWORTH.

---

Copies of this patent may be obtained for five cents each, by addressing the "Commissioner of Patents, Washington, D. C."